United States Patent [19]

Barna et al.

[11] Patent Number: 4,519,442
[45] Date of Patent: May 28, 1985

[54] HEAT EXCHANGE STRUCTURE

[75] Inventors: Gordon L. Barna, Martinez; James W. Lippert, Livermore, both of Calif.

[73] Assignee: Kaiser Aluminum & Chemical Corporation, Oakland, Calif.

[21] Appl. No.: 640,711

[22] Filed: Aug. 14, 1984

[51] Int. Cl.³ .............................................. F28D 17/04
[52] U.S. Cl. .................................... 165/9.2; 165/9.4; 165/9.1
[58] Field of Search ................................... 165/9.1–9.4

[56] References Cited

U.S. PATENT DOCUMENTS 3,134,584  5/1964  Agnew .................................. 165/9.1
3,135,505  6/1964  Agnew .................................. 165/9.3

FOREIGN PATENT DOCUMENTS 745 of 1915  United Kingdom ................. 165/9.2
421693 12/1934  United Kingdom ................. 165/9.2
433762  8/1935  United Kingdom ................. 165/9.1

Primary Examiner—Albert W. Davis, Jr.
Attorney, Agent, or Firm—Malcolm McQuarrie

[57] ABSTRACT

A heat exchange structure is constructed from refractory blocks having three linearly aligned flue-forming openings extending from top to bottom of the block. The central opening is surrounded on four sides by refractory and the two end openings are surrounded on three sides. These refractory shapes are assembled in an open basketweave structure to form the heat exchanger. The resulting structure contains vertically extending, interconnected flues of two types, (1) flues of a first type interconnected at alternate layers in the structure to each of the four contiguously adjacent flues and (2) flues of a second type connected to opposed pairs of contiguously adjacent flues at alternate levels and to the other pair of contiguously adjacent flues at the intermediate levels. The net result is a stable heat exchange structure with relatively thin walls, relatively large flues, and means for creating turbulence in gas passing through the exchanger, thus increasing the rate of heat exchange.

6 Claims, 5 Drawing Figures

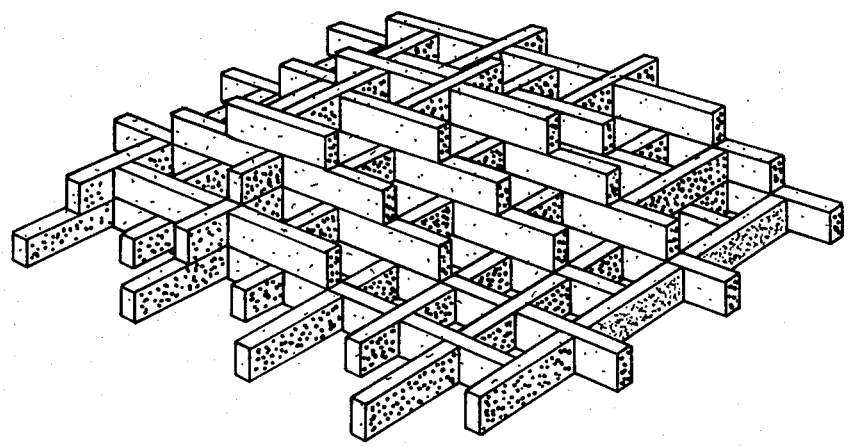
FIG._1. (PRIOR ART)
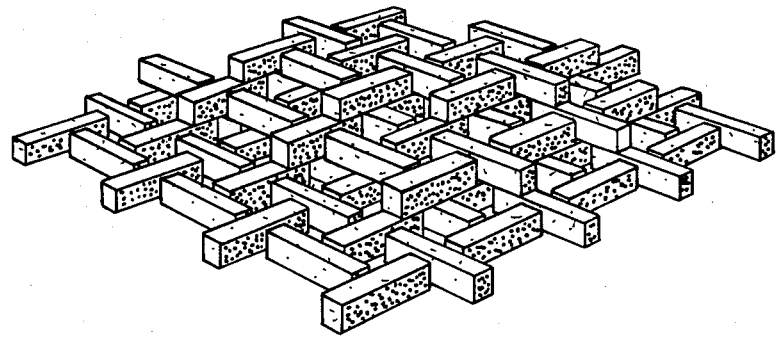
FIG._2. (PRIOR ART)
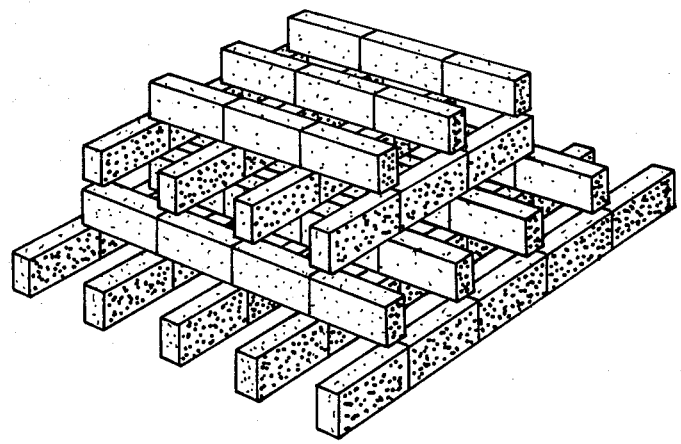
FIG._3. (PRIOR ART)

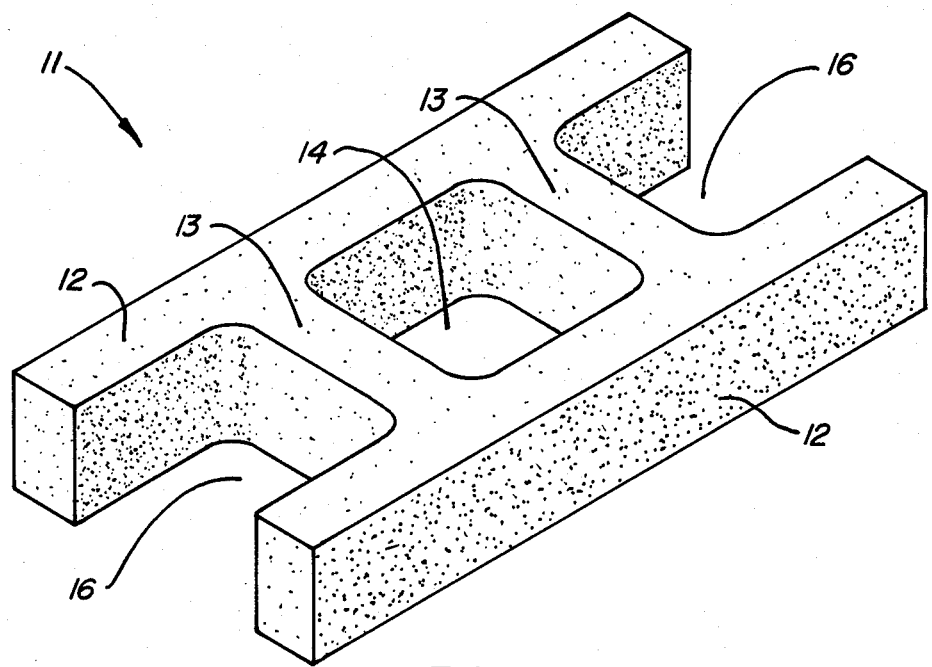
FIG._4.
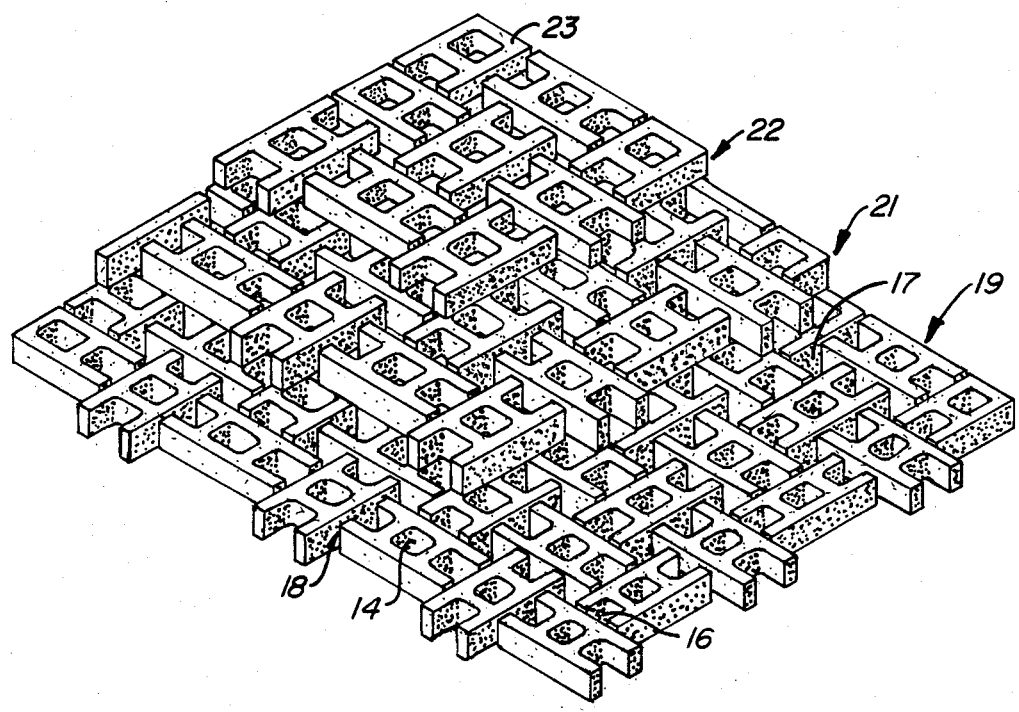
FIG._5.

HEAT EXCHANGE STRUCTURE

BACKGROUND OF THE INVENTION

This invention pertains to heat exchange structures, particularly such structures made of refractory materials.

Such heat exchangers are used in blast furnace stoves, glass tank checkers, and other applications. The present invention will be described with respect to its use in glass tank checkers since it has found particular application there. However, it will be apparent to those skilled in the art that it has wider application.

It is common to make glass tank checkers of standard refractory brick, that is to say, rectangular shaped 9×4½×2½ inches (23×11.5×6.4 cm) in size. However, the checkers in glass tank regenerators can be constructed in many different ways from this single standard shape, and the design of a checker or heat exchanger requires careful balance of several different factors.

One factor is the cross-sectional area of the flues or vertical channels through the checker. (It is common to construct the heat exchangers associated with glass tanks so that the gases pass vertically through the checker. However, it will be evident to those skilled in the art that the principles of the present invention are equally applicable to heat exchangers wherein the gases flow horizontally.) For purposes of maximum heat exchange, narrow flues are desirable. However, narrow flues lead to large pressure drops across the checker in order to move the requisite amount of gas through. Also, narrow flues tend to be more easily clogged, for example by material carried out of the glass tank by the hot gases flowing from the tank to the heat exchanger.

Another factor is the thickness of the refractory walls between the flues. The thinner these walls, the more quickly heat will penetrate to the center of the wall, better utilizing the mass of the brick. On the other hand, more heat can be stored in a thicker refractory wall. Perhaps more importantly, if the wall is too thin, the checker structure can be mechanically unstable and may collapse. (It is customary in these structures to place the standard refractory shape lengthwise on its side so that the refractory wall between flues is 2.5 inches (6.4 cm) thick and the height of a single layer or level of brick in the checker is 4.5 inches (11.5 cm). While it would be quite easy to make thinner brick, for example brick 1.5 inches (3.8 cm) thick, it appears that the 2.5 inch (6.4 cm) dimension is the minimum thickness which will yield a satisfactorily stable checker structure using standard brick shapes.)

Another factor to be considered is the amount of solid refractory in a unit volume of checker structure. The higher this figure, the greater is the amount of heat which can be stored in the unit volume. This factor is interrelated with flue size and wall thickness. For example, a large amount of solid material per unit volume of checker implies less flue volume, with its attendant disadvantages.

Still another factor is the amount of heat transfer surface available per unit mass of solid refractory. It is desirable that this factor be large so that there can be more rapid heat transfer from the gases to the refractory or vice versa. (It will be understood that, in a glass tank checker, the checker brick are first heated by hot combustion gases flowing from the glass melting furnace down through the checker to the exhaust stack and that then the flow of gas through the checker is reversed, cool incoming air for combustion flowing up through the checker to be preheated before it enters the glass tank to support combustion of the fuel therein.)

While a higher ratio of surface area to volume of solid material is desirable for heat transfer, it implies larger flue volume and relatively less solid material per unit volume of checker, together with the concomitant disadvantages thereof.

Thus it can be seen that the designer of a heat exchanger, for example a glass tank checker, is faced with a multitude of choices and is seeking to construct the most efficient heat exchanger with the materials available. A brief examination of some prior art checker structures will indicate how these factors have been handled in practice.

FIG. 1 shows a well-known type of checker structure known as "basketweave". As can be seen from the figure, for a given size of brick, this structure results in relatively small flues which are continuous from top to bottom of the structure and which have no interconnection with any adjacent flues. While this structure is very stable, it has one big disadvantage: if a blockage occurs somewhere within the flue, that flue is rendered totally inoperative and thus reduces the capacity of the checker, as well as increasing the pressure drop necessary to force a given amount of gas through the checker.

FIG. 2 shows a closely related, and commonly used, checker structure known as "open basketweave". Here, as can be seen from the figure, the individual brick are laid in the same arrangement as in the basketweave structure, but are spaced horizontally from each other. The result is continuous vertical flues, each of which is connected at each level in the structure to the four contiguously adjacent flues. One result of this structure is that the flues are slightly larger than the basketweave flues and that, concomitantly, there is less solid refractory material per unit volume of the checker. However, perhaps the most important feature of this open structure is that if there is blockage at some point in the flue, the gases passing down that flue can flow outwardly to adjacent flues and back into the blocked flue below (or above, depending on the direction of gas flow) the blockage. Thus, a blockage does not so significantly affect the capacity of the checker. Another advantage of this open structure is the introduction of turbulence into the gases flowing through the checker, with resulting better heat exchange between the gas and the solid.

FIG. 3 shows a third type of prior art checker structure, one known as "pigeonhole" sometimes called open-flue construction. As can be seen from the figure, this leads to the largest size flues of the three structures discussed, but at the same time has the least amount of solid refractory per unit volume of checker. On the other hand, the very open structure of the pigeonhole construction minimizes problems with clogging and generally lowers the pressure drop required across the structure (with the consequent savings in fans and motors needed to move the hot gases).

In addition to the structures discussed using standard refractory shapes, there are many special shapes which have been suggested exclusively for use as heat exchanger shapes. See, for example, U.S. Pat. No. 2,451,392, U.S. Pat. No. 3,456,937, and U.S. Pat. No. 4,282,923. Fundamentally, these have been attempts to achieve maximum thermal efficiency in a given type of heat exchanger for a given application. While it is not practical to discuss each of these prior art shapes in detail, it can be said that none discloses the heat exchanger structure of the present invention.

The present invention is directed to a refractory shape and heat exchange structure constructed therefrom which increases the thermal efficiency of a heat exchanger as compared with prior art structures, particularly with respect to stability of the structure, the thinness of the walls between flues, and the introduction of turbulence into the gases flowing through the structure.

SUMMARY OF THE INVENTION

It has now been found, according to this invention, that a more efficient exchange structure is obtained when it contains at least two different types of flues, (1) a first type which has openings to each of the four contiguously adjacent flues at alternate levels and no connection to any other flue at the levels intermediate to the levels with openings and (2) a second type which has openings to two opposed contiguously adjacent flues at alternate levels and openings to the other two opposed contiguous adjacent flues at the intermediate levels.

BRIEF DESCRIPTION OF THE DRAWINGS

FIG. 1 is a perspective view of the prior art basketweave checker structure.

FIG. 2 is a perspective view of the prior art open basketweave checker structure.

FIG. 3 is a perspective view of the prior art pigeonhole checker structure.

FIG. 4 is a perspective view of a refractory shape used to construct the heat exchange structure of the present invention.

FIG. 5 is a perspective view showing one example of the construction of a heat exchanger according to the present invention.

DETAILED DESCRIPTION

A refractory block used to construct the heat exchanger of the present invention is shown in FIG. 4. Basically, it is a rectangular block 11 having two solid long sides 12 joined by two crossarms 13. In other words, the block has three flue-forming recesses in a row along its length, the middle recess 14 being surrounded by refractory on four sides (and, of course, being open at the top and the bottom as are all the flue-forming openings) and two other openings 16, one at each end, surrounded on three sides by refractory. While the specific dimensions of the block are not critical, a block which has been used measures 18 inches (46 cm) long by 9 inches (23 cm) wide by 3 inches (7.6 cm) high and has a central opening 5.5 inches (14 cm) on a side and end openings 5.5 inches (14 cm) by 4.5 inches (11.5 cm). Obviously, however, larger or smaller blocks may be used. In this particular block, as can readily be determined, the wall thickness was 1.75 inches (4.4 cm). However the wall thickness of the block can vary from 1 to 2 inches (2.5 to 5 cm), the size of central opening can vary from 4 to 6.5 inches (10 to 16.5 cm), with the end openings varying correspondingly. As will be apparent to those skilled in the art, the length, width, and wall thickness dimensions will affect the thermal performance of the checker, and will be chosen with that performance in mind. The height of the block is generally adjusted so as to minimize the number of blocks in the checker structure (so as to lead to lower labor costs in construction) consistent with having a block that is not too heavy to handle. However, the height and frequency of the openings between flues, which are directly related to the height of the block, may have some effect on thermal performance.

These refractory shapes are assembled, as shown in FIG. 5, in what amounts to an "open basketweave" configuration. More specifically, the blocks in any one layer (e.g., first layer 19 in FIG. 5) are laid in lines so that they alternate lying lengthwise and crossways along the line, the blocks in an adjacent row being similarly laid, but displaced one-half a block length along the length of the row. The net result is that, in addition to the solid flue element formed by the central openings 14 in the blocks and the flue segments formed by the three-sided openings 16 in one block facing the solid side of an adjacent block, there is a third flue segment 17 formed by the juxtaposition of four blocks. The spacing 18 between blocks, which preferably is at least one inch, provides openings between the latter two types of flue segments, openings which permit flow of gas from one flue to the next.

The next layer of refractory blocks (e.g., layer 21 in FIG. 5) is placed above the first layer but displaced along a diagonal direction. In other words, the solid flue segment formed by the central opening 14 in a block in second layer 21 overlies flue segment 17 in the first layer formed by the juxtaposition of four blocks. The third layer of blocks (e.g., 22 in FIG. 5) is then laid directly over the blocks in first layer 19, and the structure continued thus up to the top of the heat exchange checker.

The net result of this structure is that there are two distinct types of flues in the checker. The first type of flue has four openings to the four contiguously adjacent flues at every other layer in the structure. (By the term "contiguously adjacent" is meant the flues which lie next to and share a common wall with the given flue.) The second type of flue formed by this structure is one in which there are openings in each layer of the flue but to only two oppositely contiguously adjacent flues, the openings leading to one pair of adjacent flues in one layer and in every alternate layer above or below it, and to the other pair of adjacent flues in the intermediate layers. In other words, the structure of the heat exchanger of this invention has two different types of flues produced by a single refractory shape. (It will be evident that cut shapes, such as shape 23 in FIG. 5, are used at the edges of the checker structure).

While the structure of the heat exchanger according to this invention is illustrated using the refractory block shown in FIG. 4, it will be understood that the basic principal of the invention lies in the two different types of flues described, and that other types of refractory shapes could be used to practice the invention.

Among the advantages of the heat exchanger of the present invention are: (1) that it is possible to have relatively thinner refractory walls between flues than is possible with the prior art structures discussed above, in a mechanically very stable structure and (2) that the interconnections between the two different types of flues leads to turbulence in the flowing gases, thus increasing heat transfer. It is believed that the different aerodynamic configuration of the two types of flues leads to a pressure difference between these two flues at the same level and therefore causes flow from one flue to another, leading to turbulence which will impede formation of a laminar boundary layer and which will increase the heat transfer coefficient. (Formation of a boundary layer is undesirable since it reduces heat transfer between gas and solid).

While the structure of the present invention has been described with the flue-forming elements of the block in one layer exactly aligned with the flue-forming elements in the blocks of the layer below, it will be understood that such perfect alignment is not necessary. In fact, there may be an advantage, for example increased turbulence, in placing the blocks so that there is a slight misalignment of the flue-forming openings from layer to layer.

Since glass tank heat exchange checkers and similar structures in other applications can last from five to seven years or even longer, it is not yet possible to provide an actual demonstration of the superiority of the checker structure according to this invention from actual use in industrial application. To demonstrate the thermal characteristics of the present heat exchange structure, a computer model of a glass tank checker was constructed and the effects of changing various parameters, including the use of the structure according to this invention, were evaluated in terms of their effect on the output of the model, principally the thermal efficiency of the structure and the maximum temperature to which incoming air was heated upon reaching the top of the heat exchange structure.

Without going into the details of the model, it may be said that it is designed to take into account, as inputs, 13 different furnace parameters, including glass production rate, furnace heat loss, furnace exhaust temperature, moisture in wet charge, and cold air temperature, and 15 factors pertaining to characteristics of the regenerator, including dimensions, specific surface area, solid fraction, air infiltration, size of flue opening, incoming air temperatures, and heat transfer coefficients. The particular input parameters which relate to the different regenerator structures are: specific surface area, solid fraction, fractional area for flow, size of flue opening, and convective heat transfer correlation coefficients.

This model was used to calculate the characteristics of two hypothetical, but realistic, glass tank checkers, one constructed with the prior art open basket weave using $9 \times 4.5 \times 2.5$ inch ($23 \times 11.5 \times 6.4$ cm) brick set with a 1.25 inch (3.2 cm) space and the second constructed according to the present invention using a block 15 inches (38 cm) long, 8 inches (20 cm) wide, with a 4.5 inch (11.5 cm) central opening, and a 1.75 inch (4.4 cm) wall thickness, the blocks being set with a one inch (2.5 cm) space. Both furnaces were based on a glass production rate of 20 tons per hour, a furnace exhaust temperature of 2800° F. (1540° C.), and an incoming air temperature of 400° F. (205° C.) at the rider arches. Each checker was 15 feet high, 60 feet long and 12 feet wide ($4.6 \times 18.3 \times 3.7$ meters). The prior art checker had a specific area of 4.1 square feet/cubic foot (0.135 square centimeters/cubic centimeter), a solid fraction of 0.46, and a fractional cross sectional area for flow of 0.41. The checker according to the present invention had a specific area of 5.4 square feet/cubic foot (0.177 square centimeters/cubic centimeter), a solid fraction of 0.44, and a fractional cross sectional area for flow of 0.52.

Thus, it can be seen that the checker according to the present invention had higher specific surface and cross sectional area for flow and a slightly lower solid fraction.

The model calculated that the heat input to the furnace with the prior art checker, to maintain the specified production rate, was 149 million BTU/per hour, whereas the furnace having the checker according to the present invention required only 141 million BTU/per hour, a reduction of over 5%. It will be evident to those skilled in the art that this reduction in heat consumption for a given glass output has great economic significance.

Another measure of the effectiveness of a glass tank regenerator is average regenerator effectiveness, which is defined as the temperature increase of the incoming air passing up through the checker divided by (furnace exhaust temperature minus incoming air temperature). Using the model, an average regenerator effectiveness of 67.6% was obtained for the prior art checker, whereas the average regenerator efficiency of the checker according to the present invention was 73.8%. Again, the superiority of the checker according to the present invention is apparent.

We claim:

1. In a heat exchange structure made of individual refractory shapes so as to define interconnected vertical flues extending from top to bottom of the structure, the structure being divided into horizontal levels defined by the vertical height of the individual refractory shapes, the improvement wherein the structure has at least two different type of flues, (1) a first type which has openings to each of the four contiguously adjacent flues at alternate levels and no connection to any other flue at the levels intermediate to the levels with openings and (2) a second type which has openings to two opposed contiguously adjacent flues at alternate levels and openings to the other two opposed contiguous adjacent flues at the intermediate levels.

2. Structure according to claim 1 constructed of rectangular refractory blocks having three linearly aligned flue-forming openings, the two end openings being surrounded on three sides by the refractory material of the block and the middle opening being surrounded on four sides by the refractory material of the block.

3. Structure according to claim 2 wherein the flue-forming openings are of a size to form flues of from 4 to 6.5 inches on a side.

4. Structure according to claim 2 wherein the thickness of the refractory surrounding the flue-forming openings is from 1 to 2 inches.

5. Structure according to claim 3 wherein the thickness of the refractory surrounding the flue-forming openings is from 1 to 2 inches.

6. Structure according to claim 1 wherein the openings between the two types of flues extend from top to bottom of a single level and are at least 1 inch wide.

* * * * *